United States Patent
Twardowski et al.

(10) Patent No.: US 6,677,953 B1
(45) Date of Patent: Jan. 13, 2004

(54) HARDWARE VIEWPORT SYSTEM AND METHOD FOR USE IN A GRAPHICS PIPELINE

(75) Inventors: Kirk E. Twardowski, Mountain View, CA (US); Gary Tarolli, Concord, MA (US)

(73) Assignee: NVIDIA Corporation, Santa Clara, CA (US)

( * ) Notice: Subject to any disclaimer, the term of this patent is extended or adjusted under 35 U.S.C. 154(b) by 209 days.

(21) Appl. No.: 10/005,826

(22) Filed: Nov. 8, 2001

(51) Int. Cl.[7] .............................. G06F 15/00; G06T 1/20
(52) U.S. Cl. ...................... 345/506; 345/558; 345/426; 345/427; 345/561; 345/643
(58) Field of Search .................................. 345/501, 502, 345/506, 558, 561, 536, 418, 419, 426, 427, 643, 645

(56) References Cited

U.S. PATENT DOCUMENTS

| | | | | |
|---|---|---|---|---|
| 6,141,013 A | * | 10/2000 | Nelson et al. | 345/426 |
| 6,304,265 B1 | * | 10/2001 | Harris et al. | 345/421 |
| 6,532,009 B1 | * | 3/2003 | Fox et al. | 345/419 |
| 6,567,098 B1 | * | 5/2003 | D'Amora | 345/611 |
| 2001/0008400 A1 | * | 7/2001 | Moriwaki et al. | 345/534 |
| 2002/0063705 A1 | * | 5/2002 | Moriwaki et al. | 345/422 |

* cited by examiner

*Primary Examiner*—Kee Tung
(74) *Attorney, Agent, or Firm*—Silicon Valley IP Group, PC; Kevin J. Zilka (57) ABSTRACT

A system and method are provided for a dedicated hardware-implemented viewport operation in a graphics pipeline. Included is a transform/lighting module for transforming and lighting vertex data. Also provided is viewport hardware coupled to the transform/lighting module for performing a viewport operation on the vertex data. A rasterizer is coupled to the viewport hardware for rendering the vertex data.

28 Claims, 10 Drawing Sheets

VIEWPORT OPERATION EQUATIONS $$x_w = (x_{nd} + 1)\, \text{width}/2 + x$$

$$y_w = (y_{nd} + 1)\, \text{height}/2 + y$$

Vertex B $\begin{bmatrix} 2 \\ 1 \\ 0 \end{bmatrix}$ Attributes

A $\begin{bmatrix} 3 \\ 2 \\ 1 \\ 0 \end{bmatrix}$

B $\begin{bmatrix} 1 \\ 0 \\ 2 \end{bmatrix}$

A $\begin{bmatrix} 0 \\ 1 \\ 2 \\ 3 \end{bmatrix}$

| put Patterns | Throughput (cycle per vertex) | Remarks |
|---|---|---|
| XYZ{RGBASTQ} | 11 (0 bubble) | Output unit is busy all the time. |
| XYZ {RGBA} | 10 (2 bubbles) | Limited by the 10 cycles reciprocal unit latency. |
| XYZ {RGB} | 10 (3 bubbles) | Limited by the 10 cycles reciprocal unit latency. |
| XYZ 4*{RGBA} | 20 (0 bubble) | Output unit is busy all the time. |
| XYZ 8*{RGBA} | 36 (0 bubble) | Output unit is busy all the time. |
| XYZ {STQ} | 10 (3 bubbles) | Limited by the 10 cycles reciprocal unit latency. |
| XYZ 4*{STQ} | 18 (2 bubbles) | Command unit is stalled because the recip unit is busy. Bubbles caused by feedback data. |
| XYZ 8*{STQ} | 30 (2 bubbles) | Command unit is stalled because the recip unit is busy. Bubbles caused by feedback data. |
| XYZ 4*{RGBASTQ} | 32 (0 bubble) | Output unit is busy all the time. |
| XYZ 8*{RGBASTQ} | 60 (0 bubble) | Output unit is busy all the time. |
| XYZ {Packed RGBA} | 10 (2 bubbles) | Limited by the 10 cycles reciprocal unit latency. |
| XYZ 4*{Packed RGBA} | 20 (no bubble) | Command unit is stalled because rgba fifo is full. Throughput is 1 parameter per cycle. |
| XYZ 8*{Packed RGBA} | 36 (no bubble) | Command unit is stalled because rgba fifo is full. Throughput is 1 parameter per cycle. |
| XYZ {ST} | 10 (4 bubbles) | Limited by the 10 cycles reciprocal unit latency. |
| XYZ 4*{ST} | 14 (2 bubbles) | Command unit is stalled because the recip unit is busy. Bubbles caused by feedback data. |
| XYZ {A} | 10 (5 bubbles) | Limited by the 10 cycles reciprocal unit latency. |
| XY {A} | 10 {6 bubbles} | No Z. Limited by the 10 cycles reciprocal unit latency. |

HARDWARE VIEWPORT SYSTEM AND METHOD FOR USE IN A GRAPHICS PIPELINE

FIELD OF THE INVENTION

The present invention relates to computer graphics, and more particularly to a viewport operation in a computer graphics processing pipeline.

BACKGROUND OF THE INVENTION

Three dimensional graphics are central to many applications. For example, computer aided design (CAD) has spurred growth in many industries where computer terminals, cursors, CRT's and graphics terminals are replacing pencil and paper, and computer disks and tapes are replacing drawing vaults. Most, if not all, of these industries have a great need to manipulate and display three-dimensional objects. This has lead to widespread interest and research into methods of modeling, rendering, and displaying three-dimensional objects on a computer screen or other display device. The amount of computations needed to realistically render and display a three-dimensional graphical object, however, remains quite large and true realistic display of three-dimensional objects have largely been limited to high end systems. There is, however, an ever-increasing need for inexpensive systems that can quickly and realistically render and display three dimensional objects.

One industry that has seen a tremendous amount of growth in the last few years is the computer game industry. The current generation of computer games is moving to three-dimensional graphics in an ever increasing fashion. At the same time, the speed of play is being driven faster and faster. This combination has fueled a genuine need for the rapid rendering of three-dimensional graphics in relatively inexpensive systems. In addition to gaming, this need is also fueled by e-Commerce applications, which demand increased multimedia capabilities.

Rendering and displaying three-dimensional graphics typically involves many calculations and computations. For example, to render a three dimensional object, a set of coordinate points or vertices that define the object to be rendered must be formed. Vertices can be joined to form polygons that define the surface of the object to be rendered and displayed. Once the vertices that define an object are formed, the vertices must be transformed from an object or model frame of reference to a world frame of reference and finally to two-dimensional coordinates that can be displayed on a flat display device. Along the way, vertices may be rotated, scaled, eliminated or clipped because they fall outside the viewable area, lit by various lighting schemes, colorized, and so forth. Thus the process of rendering and displaying a three-dimensional object can be computationally intensive and may involve a large number of vertices.

Figure 1:
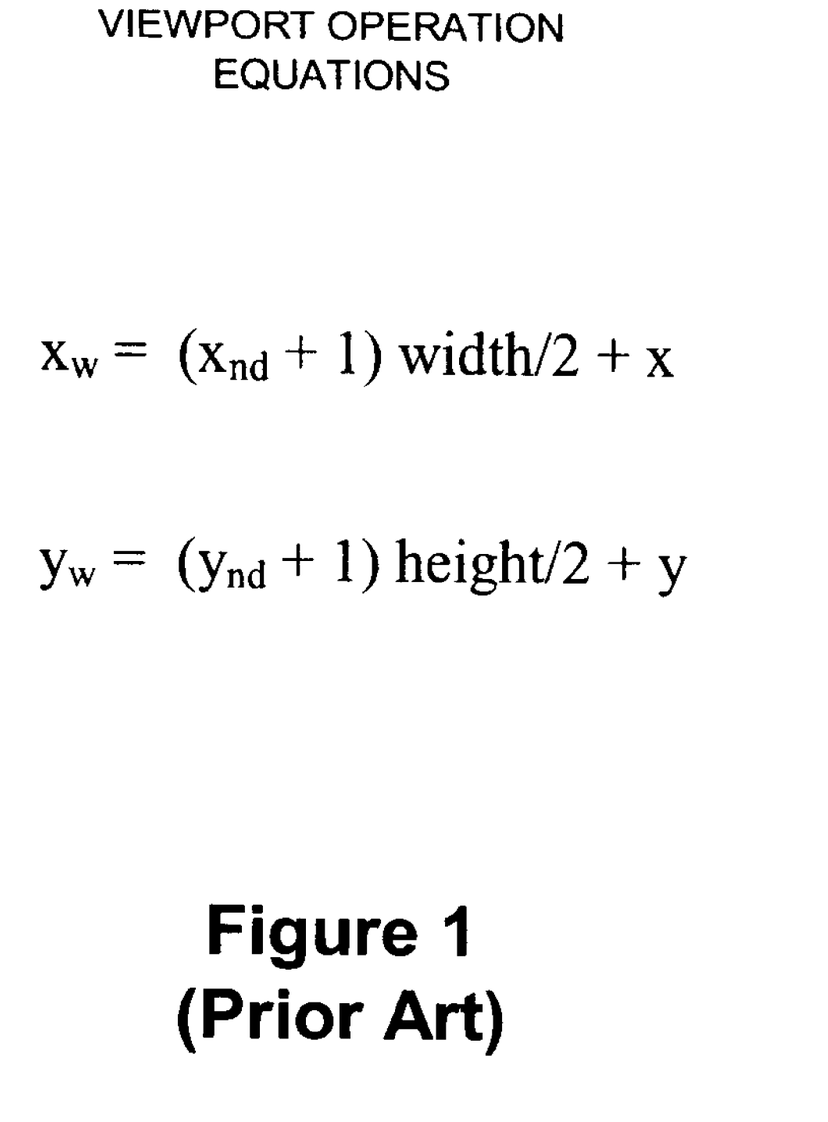
FIG. 1 shows prior art viewport equations.

One specific operation that is traditionally computation intensive is a viewport operation. The viewport operation specifies the affine transformation of x and y from normalized device coordinates to window coordinates. With ($x_{nd}$, $y_d$) being normalized device coordinates that are divided by a w-value, the window coordinates ($x_w$, $y_w$) are computed with the equations set forth in FIG. 1. As shown, a viewport width and height are clamped to a range that depends on the implementation.

Such viewport transform operation is traditionally carried utilizing software due to the expensive nature of the operations—mainly expensive floating arithmetic like multiplication and division that are often not cost effective to be implemented in hardware. However, performing floating point operations in software is very slow. Thus, viewport transformation is a significant bottleneck in a graphics pipeline. With the growing demand for higher performance graphics for computers, the need for speeding up the viewport transform operations becomes imperative.

There is thus a general need to increase the speed of the various graphics processing components, while minimizing costs. In general, integration is often employed to increase the speed of a system. Integration refers to the incorporation of different processing modules on a single integrated circuit. With such processing modules communicating in a microscopic semiconductor environment, as opposed to external buses, speed is vastly increased.

Integration if often limited, however, by a cost of implementing and manufacturing multiple processing modules on a single chip. One reason for this increase in cost is that the required integrated circuit would be of a size that is too expensive to be feasible.

DISCLOSURE OF THE INVENTION

A system and method are provided for a dedicated hardware-implemented viewport operation in a graphics pipeline. Included is a transform/lighting module for transforming and lighting vertex data. Also provided is viewport hardware coupled to the transform/lighting module for performing a viewport operation on the vertex data. A rasterizer is coupled to the viewport hardware for rendering the vertex data.

In one embodiment, the viewport hardware includes a multiplier, an adder, a first and second scaler modules, a pair of first-in-first-out (FIFO) buffers, an inverse operation module, and a plurality of multiplexers for carrying out the viewport operation.

In another embodiment, the vertex data may be tagged in the viewport hardware. Further, the viewport operation may be carried out utilizing a plurality of parallel pipelines in the viewport hardware for acceleration purposes.

By this design, the tagging may be used to process the vertex data in the viewport hardware out of order, while outputting the vertex data in proper order. In particular, the vertex data may be processed in the viewport hardware based on a priority scheme.

As an option, the aforementioned parallel pipelines may include a first pipeline for processing a first set of vertex data including x-values, y-values, z-values, s-values, t-values, and q-values. The first set of vertex data may be buffered, transformed, and scaled utilizing the first pipeline in the viewport hardware.

Further, the parallel pipelines may include a second pipeline for processing a second set of vertex data including a-values, r-values, g-values, and b-values. The second set of vertex data may be buffered, unpacked, and scaled utilizing the second pipeline in the viewport hardware.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

Figure 2:
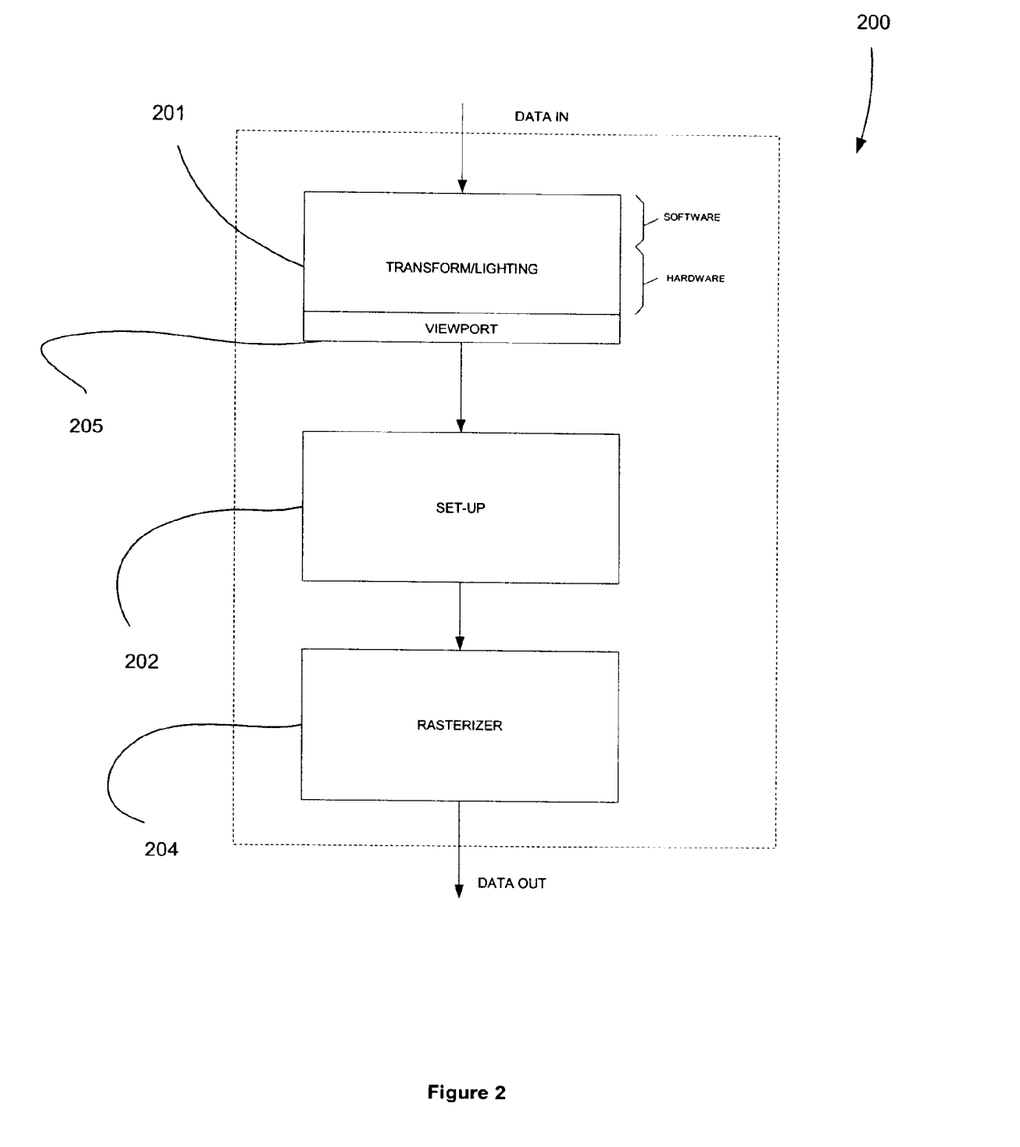
FIG. 2 illustrates an exemplary graphics pipeline, in accordance with one embodiment.

FIG. 2 illustrates an exemplary graphics pipeline 200, in accordance with one embodiment. As shown, included are a transform/lighting engine 201, a set-up module 202, and a rasterizer 204.

During operation, the transform/lighting engine 201 may be used to perform scaling, rotation, and projection of a set of three dimensional vertices from their local or model coordinates to the two dimensional window that will be used to display the rendered object. Still yet, the transform/lighting engine 201 is capable of lighting such vertices.

In one embodiment, the various operations associated with the transform/lighting engine 201 may be executed utilizing a hardware-implemented graphics pipeline (i.e. graphics accelerator). In the alternative, the operations of the transform/lighting engine 201 may be carried out utilizing a host processor and associated software. Of course, any combination of hardware and software may be utilized per the desires of the user.

The viewport module 205 utilizes world space coordinates provided for each vertex to determine the two dimensional screen space coordinates at which those vertices are to appear on the two dimensional window.

The setup module 202 and the rasterizer module 204 together use the two dimensional screen space coordinates of three vertices to determine the position of each pixel contained inside of the triangle defined by the vertices. Accordingly, the setup module 202 and the rasterizer module 204 together generate interpolated colors, depth and texture coordinates.

In one embodiment where most or all of the operations of the transform/lighting engine 201 are executed in hardware, each of the foregoing modules may be situated on a single semiconductor platform. In the present description, the single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the various modules may also be situated separately or in various combinations of semiconductor platforms per the desires of the user.

As mentioned earlier, one specific operation of the transform/lighting engine 201 is the viewport operation. The viewport operation specifies the affine transformation of x and y from normalized device coordinates to window coordinates. In the present embodiment, the viewport operation is carried out in dedicated viewport hardware 205 capable of carrying out the equations of FIG. 1 or the like. While any hardware capable of executing the equations of FIG. 1 may be used, one exemplary hardware configuration will now be set forth during reference to FIG. 3.

In use, the dedicated viewport hardware 205 performs a perspective divide on various vertex data values (i.e. x, y, z, s, t, q-values) utilizing a w-value. A viewport transformation of x, y, and z-values also takes place including various scaling functions on the vertex data prior to sending the same to the setup module 202. Table 1 summarizes the various functions that are performed by the dedicated viewport hardware 205.

TABLE 1

A 1/w calculation is started immediately upon receipt of a w-value.
Vertex data (i.e. x, y, z, s, t, q-values) are multiplied by 1/w.
Multiply s, t, q-values by 1/w if there are multiple textures.
Use q/w as the scaled 1/w term to handle projected textures.
Perform r, g, b, a-values scaling and clamping by multiplying the r, g, b, a-values by 256 for colors in a range of [0.0,1.0], scaling the r, g, b, a-values by 256/255 for colors in a range of [0.0,255.0] and clamping at a programmable maximum.
Performing a x, y, z-value viewport transform by multiplying such values by a scaling factor and adding in an offset in floating point.
Perform s, t-value scaling by subtracting a scaling factor from the s, t-value exponents to convert legacy s, t-value coordinates to an internal format of [0.0, 1.0].

The dedicated viewport hardware 205 thus processes vertices. It does not necessarily have a notion as to whether these vertices belong to triangles or lines, or which vertex within those primitives it is currently processing. For each vertex, the dedicated viewport hardware 205 performs the perspective divide by the w-value and viewport transformations. The inputs to the dedicated viewport hardware 205 are primarily vertex parameters, but may also include commands and writes to control registers both inside and out of the dedicated viewport hardware 205, all of which are received at a rate of one per cycle.

The outputs of the dedicated viewport hardware 205 are transformed vertex parameters, commands and register writes all of which are generated at a rate of one per cycle. To accomplish this, the dedicated viewport hardware 205 includes a multiplier, an adder, a scaler, first-in-first-out (FIFO) buffers, a second scaler module, a wrapper module, and an inverse operation module.

The dedicated viewport hardware 205 may also be "programmed" in the following manner. First, a mode register may be written. This may specify what functions are to be performed per vertex. Second, depending on what transformations were enabled in the mode register, several control registers may be loaded to control the transformation to be performed. Various values may be loaded to prepare for the viewport calculations. For example, a viewport size, a viewport center, s and t-value scale factors, and a maximum color clamping value may be loaded.

Figure 3:
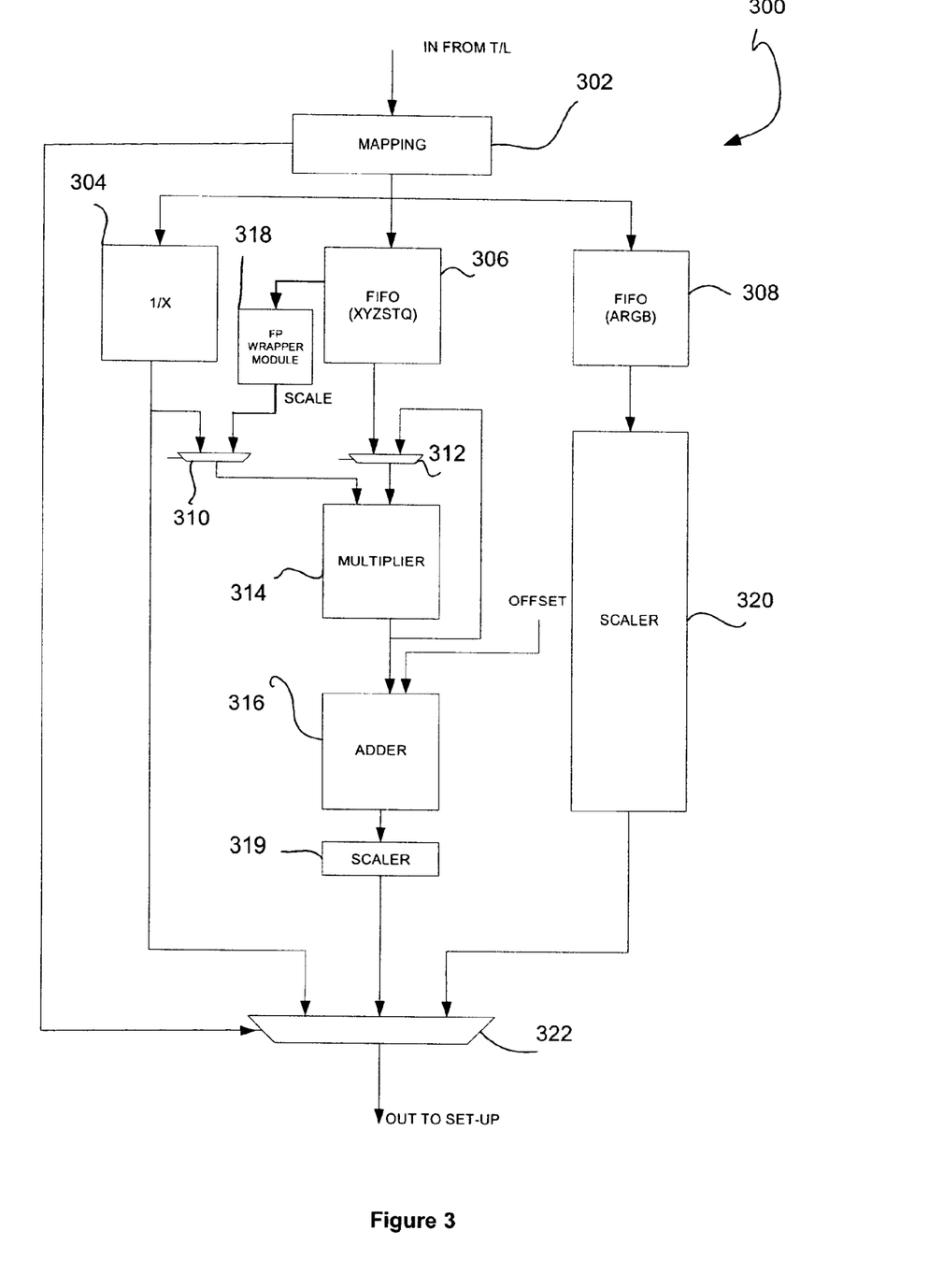
FIG. 3 illustrates an exemplary design configuration for carrying out a viewport operation in hardware, in accordance with one embodiment.

FIG. 3 illustrates an exemplary design configuration 300 for carrying out a viewport operation in hardware, in accordance with one embodiment. While one specific configuration is set forth below, it should be noted that any hardware capable of the aforementioned functions may be used.

First provided is an input module 302 coupled to the transform/lighting module 201 for receiving vertex data therefrom. In the context of the present description, vertex data may include position values (i.e. x-values, y-values, z-values, a-values, etc.), color values (i.e. r-values, g-values, b-values, etc.), lighting values, or any other values, commands, attributes, or information relating to the vertices capable of being processed or passed by the design configuration 300.

As will soon become apparent, the input module 302 is coupled to an inverse operation module 304, a first FIFO buffer 306, and a second FIFO buffer 308 which each represent a component of a separate "sub-pipeline" through which data is processed in parallel. In use, the input module 302 serves to control the inflow of vertex data so that the same is appropriately operated on by the hardware. This is accomplished by ensuring that certain values are transferred to the appropriate sub-pipeline of the present design 300, and further controlling which vertex data is outputted from the present design 300.

In particular, the input module 302 receives vertex data in addition to register writes. A w-value is sent down to the inverse operation module 304 immediately for processing, while r, g, b, a-values are pushed into the second FIFO buffer 308 and x, y, z, s, t, q-values are pushed into the first FIFO buffer 306. Viewport register writes are sent down the pipe to reach the corresponding units while data not required for the viewport operation may be passed down the r, g, b, a-value pipe.

The input module 302 also generates a tag for distinguishing between parameter data from multiple vertices and non-viewport data. It should be noted that the inclusion and distinguishing of the non-viewport data in the pipelines serve as a "fencing" mechanism, since vertex data of different vertices is usually separated by various non-viewport commands.

The tag may also be pushed into the second FIFO buffer 308 and travel down the associated pipe accordingly. More information on such tag and related functions will be set forth hereinafter in greater detail.

The input module 302 also handles various stall conditions. For example, it may stall a command processor when either one of the FIFOs is full or when a new w-value is received, while the inverse operation module 304 is still working on the w-value from a previous vertex.

Further, the input module 302 also generates a 6-bit offset count for the vertex parameters. This offset count may be used by the setup module 202 to generate the address used to write the parameter to the vertex array. This offset may continually run for all inputs to the viewport hardware 205 (i.e., it increments for all inputs). This offset may travel through the pipeline with the parameter so that it can be sent to the setup module 202 along with the associated parameter.

Figure 4:
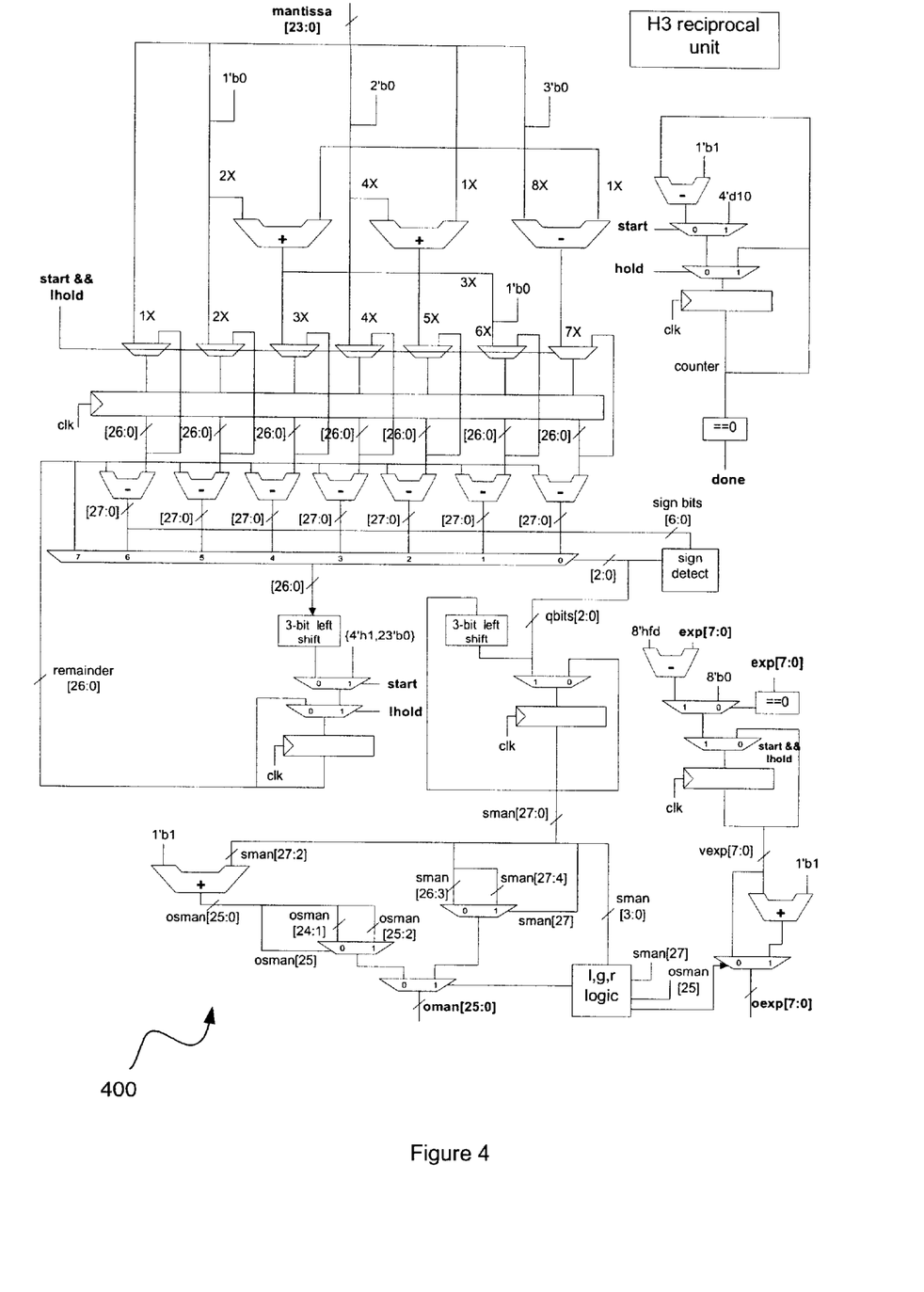
FIG. 4 illustrates an exemplary inversion operation module design, in accordance with one embodiment.

Also included is an inverse operation module 304 having an input coupled to an output of the input module 302 for receiving the vertex data therefrom. In use, the inverse operation module 304 is adapted for performing an inverse operation (i.e. a floating point reciprocal) on the vertex data, which is required in order to carry out the viewport operation. FIG. 4 illustrates an exemplary inversion operation module design 400, in accordance with one embodiment.

Next provided is a first FIFO buffer 306 including an input coupled to the output of the input module 302 for receiving a first set of vertex data therefrom for temporary storage therein. As mentioned earlier, such first set of vertex data includes x-values, y-values, z-values, s-values, t-values, and q-values.

Associated therewith is a second FIFO buffer 308 including an input coupled to the output of the input module 302 for receiving a second set of vertex data therefrom for temporary storage therein. Such second set of vertex data includes a-values, r-values, g-values, and b-values. As an option, both FIFOs may be 8-values deep and 54-bits wide.

Also included is a first multiplexer 310 having a first input coupled to an output of the inverse operation module 304. A second input of the first multiplexer 310 is provided for receiving scaling values. Such scaling values include Xsize, Ysize, and Zsize for multiplying X, Y, Z values. In use, the first multiplexer 310 is adapted for selectively outputting the vertex data from the first and second inputs to an output thereof. In particular, the first multiplexer 310 outputs the scaling value (i.e. x, y, and z-value sizes) during a first pass, and passes any 1/w-value calculations during a second passes.

Figure 5:
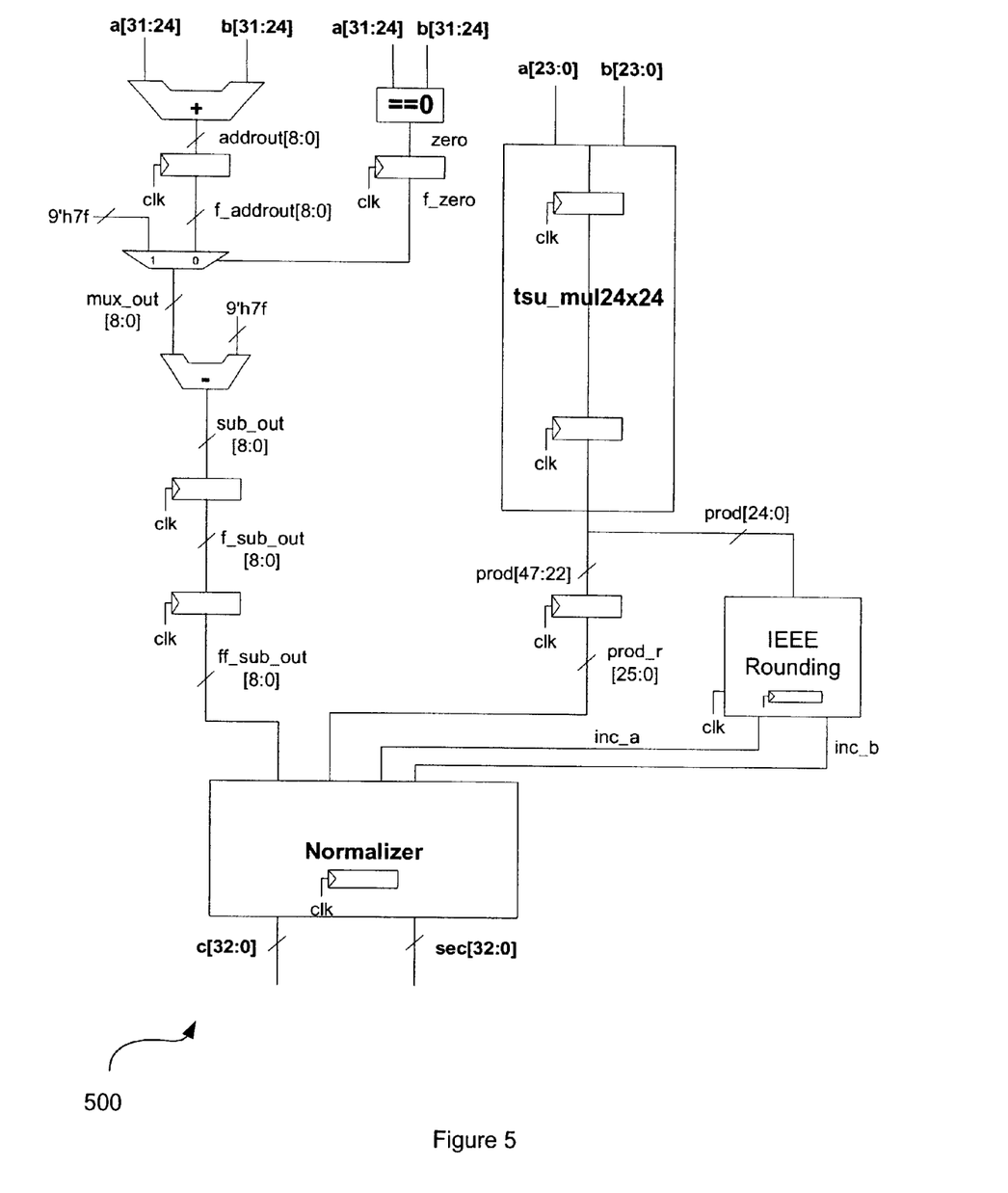
FIG. 5 illustrates an exemplary multiplier module design, in accordance with one embodiment.

Further provided is a multiplier module 314 including a first input coupled to the output of the first multiplexer 310. A second input of the multiplier module 314 is coupled to the output of a second multiplexer 312. Further, an output is coupled to the second input of the second multiplexer 312. In operation, the multiplier module 314 is adapted for multiplying the vertex data at the first and second inputs thereof. FIG. 5 illustrates an exemplary multiplier module design 500, in accordance with one embodiment.

The second multiplexer 312 is provided with a first input coupled to an output of the first FIFO buffer 306 and a second input coupled to the output of the multiplier module 314. The second multiplexer 312 serves for selectively outputting the vertex data from the first and second inputs to an output thereof In use, the second multiplexer 312 is governed to feedback the output of the multiplier whenever there are x, y, and z-values in a last stage of the multiplier. In any other case, the second multiplexer 312 feeds the x, y, and z-values from the first FIFO buffer 306.

Figure 6:
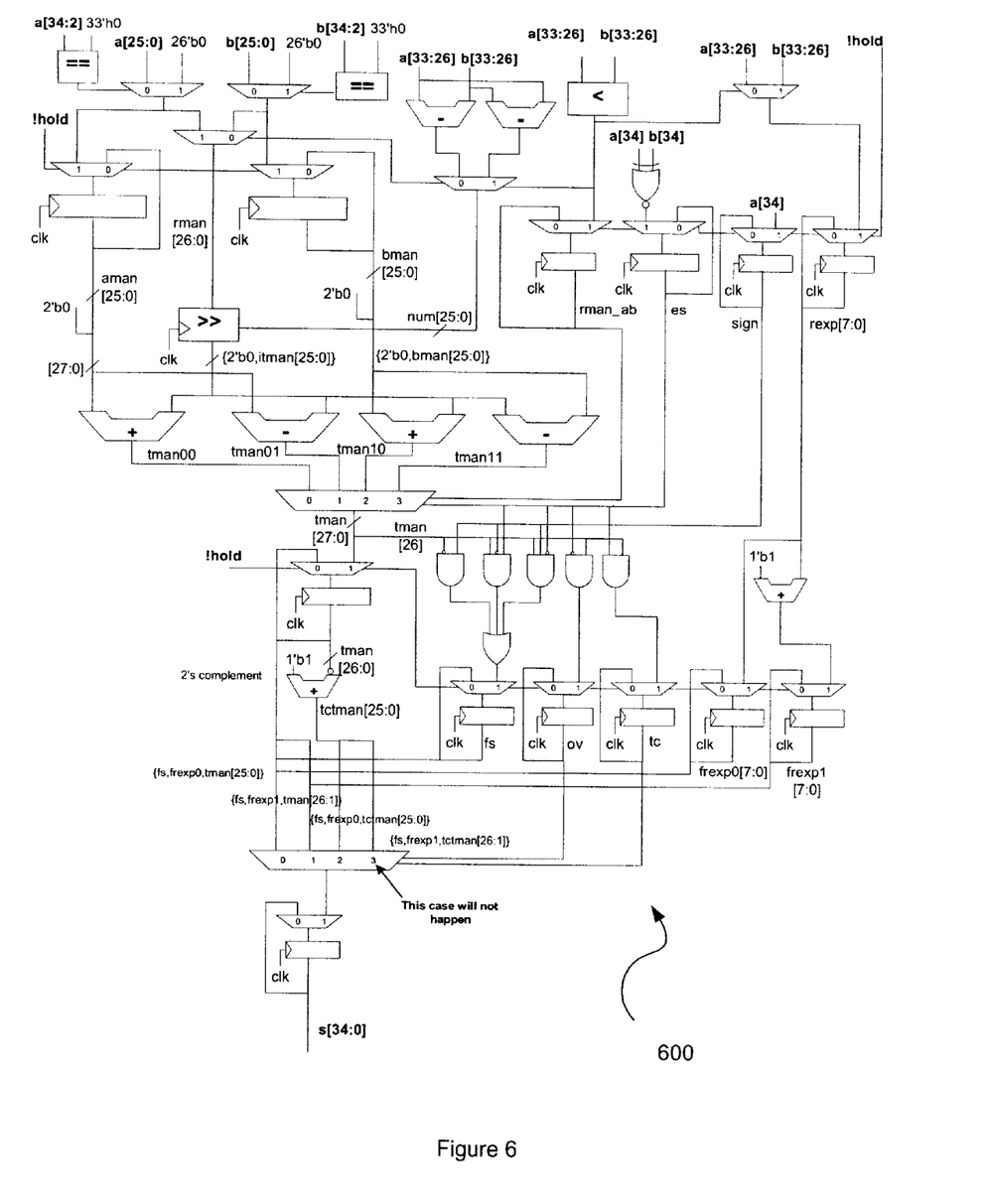
FIGS. 6 and 7 illustrate an exemplary adder module design, in accordance with one embodiment.
Figure 7:
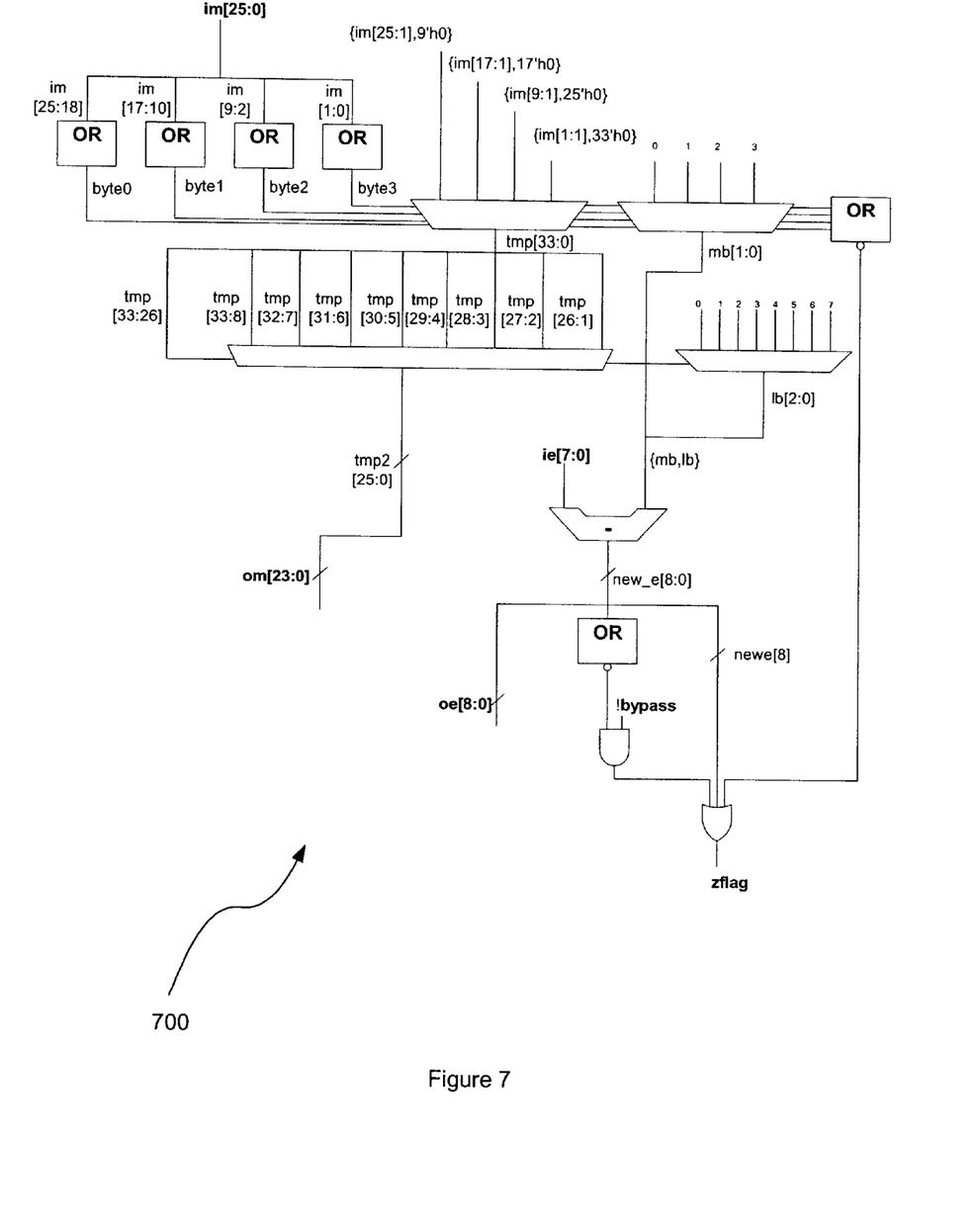

Coupled to the multiplier module 314 is an adder module 316 including a first input coupled to the output of the multiplier module 314. A second input of the adder module 316 is adapted for receiving an offset value. The adder module 316 serves for adding the vertex data at the first and second inputs thereof. FIGS. 6 and 7 illustrate an exemplary adder module design 600 & 700, in accordance with one embodiment.

In use, the multiplier module 314 multiplies s, t, q-values by 1/w if there are multiple textures. Further, q/w is used as the scaled 1/w term to handle projected textures. Moreover, a x, y, z-value viewport transform operation is carried out by multiplying such values by a scaling value, and adding in the offset value in floating point. Preferably, the scaled values are held in the pipeline via a stall until a valid 1/w term is generated by the inversion operation module, after which the feedback loop is utilized for multiplying the scaled values with the 1/w term.

Moreover, s, t-value scaling is performed by subtracting the scaling value from the s, t-value exponents to convert legacy s, t-value coordinates to an internal format of [0.0, 1.0].

Figure 8:
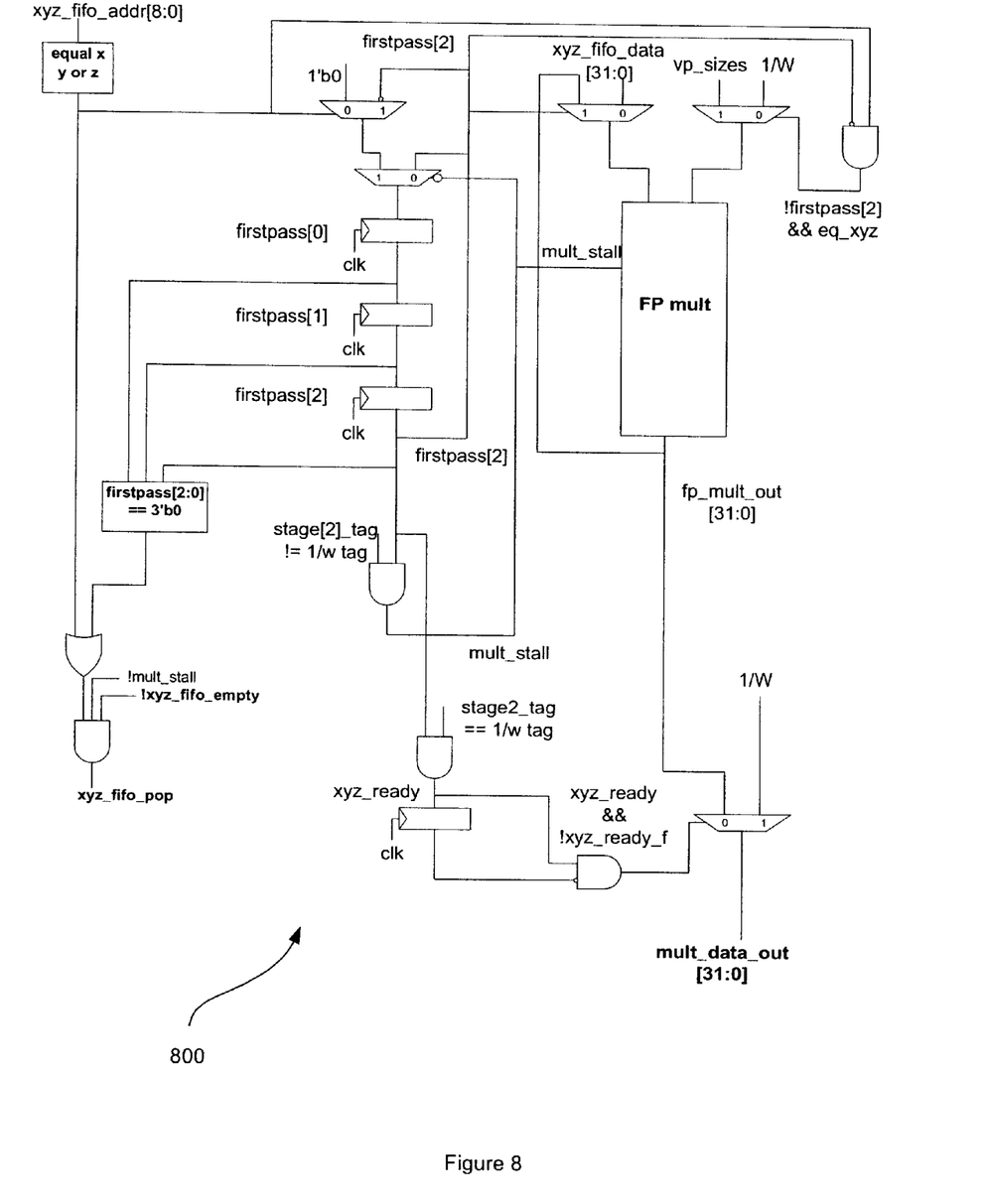
FIG. 8 illustrates an exemplary wrapper control module design, in accordance with one embodiment.

A wrapper control module 318 is also provided with an input coupled to the first FIFO buffer 306 and an output coupled to the multiplier module 314 via the first multiplexer 310. In use, the wrapper control module 318 is capable of feeding the aforementioned scaling value via the first multiplexer 310. FIG. 8 illustrates an exemplary wrapper control module design 800, in accordance with one embodiment.

A first scaler module 319 includes an input coupled to an output of the adder module 316 for scaling the vertex data.

In use, the first scaler module 319 scales the s and t-value coordinates by powers of two (2) to handle legacy s and t-value coordinates that are not in the range of 0.0 to 1.0. This may be accomplished by subtracting a 4-bit value from the exponents of the s and t-values. There may be a separate pair of scale values for each texture.

A second scaler module 320 is included having an input coupled to an output of the second FIFO buffer 308 for scaling the second set of vertex data. In particular, the second scaler module 320 scales the r, g, b, and a-values from a floating point range of [0.0, 1.0] to [0.0, 256.0] by multiplying by 256, and can also clamp them to a range of $[0.0, 2^n-1.9999]$.

In an alternate scaling mode, the input floating point numbers may be assumed to be in the range of [0.0,255.0], and the scaling desired is 256.0/255.0. This scale is performed by taking the 8 MSBs of the colors mantissa and replicating it 3 times to create a new 24 bit mantissa. To this mantissa, a 1 is added and this result may be re-normalized if the add operation overflowed.

The second scaler module 320 also processes packed r, g, b, a-value data where the four 8 bit colors are packed into a 32 bit value, and each component is in the range of 0 to 255. Basically, the second scaler module 320 unpacks the r, g, b, a-value data into individual r, g, b, and a components, scales them by 256/255 and converts them to floating point. The scaling is done by replicating the 8 bit value 3 times and adding in the MSB of the color component to the 24 bit value just formed. This is then converted into a floating point format.

The clamp function may be accomplished by comparing the exponent, after the scaling, with a programmable value that specifies the maximum exponent value. If the exponent is larger than the maximum allowed, the color is clamped to have an exponent equal to the maximum with the mantissa set to all zeros. It should be noted that this clamping is not completely accurate since it doesn't clamp colors that lie between the maximum value and the maximum value plus 1. For instance, if the maximum exponent is 8, a color with a value of 255.4 would not get clamped while the ideal clamp would clamp to 255.0.

By this design, at least two pipelines are defined, one for the x, y, z, s, t, and q-values; and one for the a, r, g, and b-values. The viewport operation is thus accelerated by this parallel design.

Also included is a third multiplexer 322 with a first input coupled to the output of the inverse operation module 304. The third multiplexer 322 further includes a second input coupled to an output of the first scaler module 319. A third input of the third multiplexer 322 is coupled to an output of the second scaler module 320. In operation, the third multiplexer 322 serves for selectively outputting the vertex data from the first, second, and third inputs to an output thereof.

Figure 9:
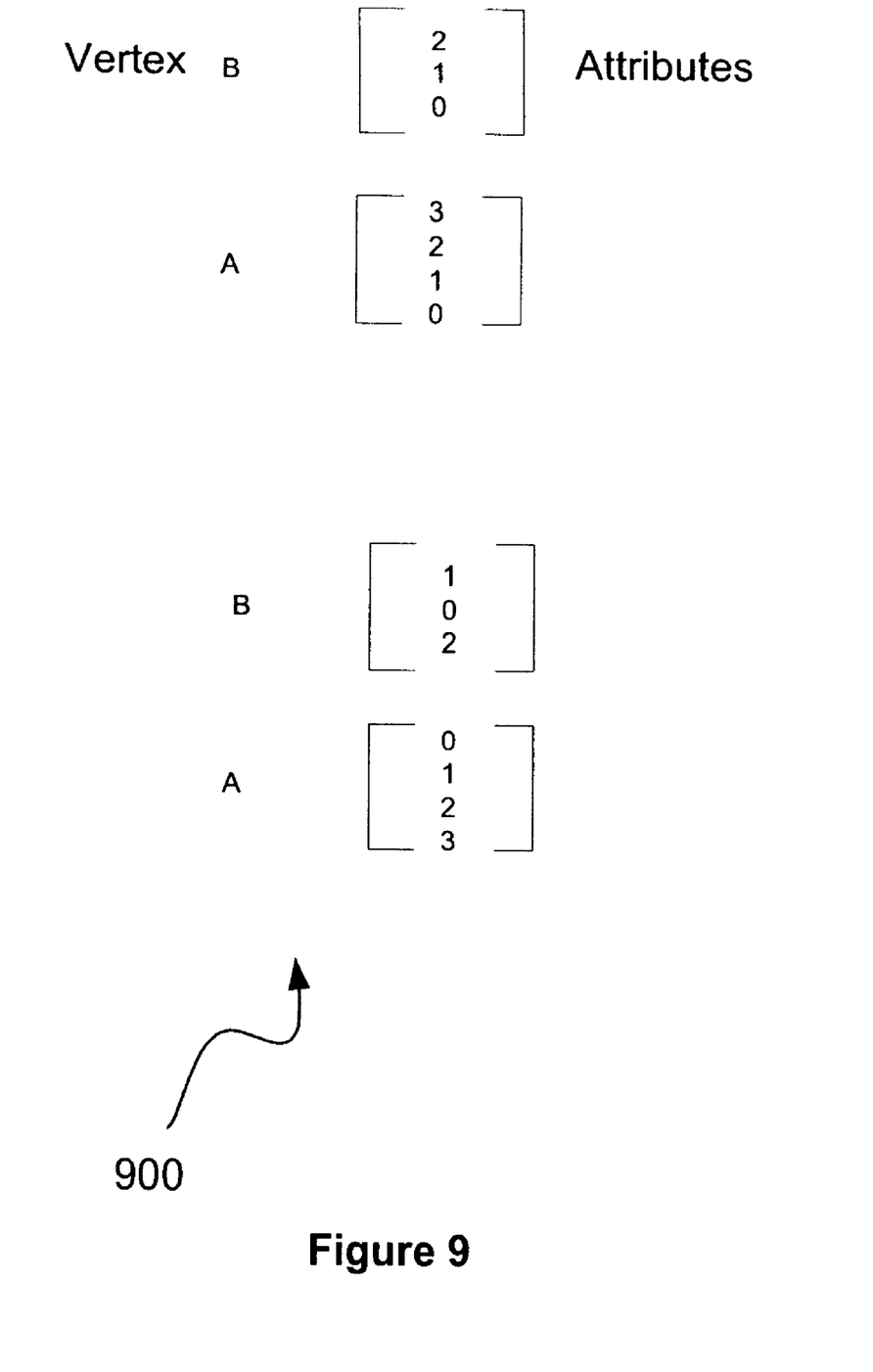
FIG. 9 illustrates the manner in which the vertex data is maintained in order when outputted by the viewport hardware.

In particular, the third multiplexer 322 ensures that vertex data is outputted following the order in which they were received. FIG. 9 illustrates the manner 900 in which the vertex data is maintained in order. As shown, the various attributes of each vertex may be processed out of order, but the vertices are outputted in the order in which they are received.

A 2 or 3-bit tag may be generated in the input module 302 to order the incoming vertices. This is important in view of the multiple pipelines defined by the present design 300. As an option, the tag may be derived from a counter, thus making each of the tags unique. That way, at any of the conflict checking points in the pipeline, priority can simply be given to the data with the lowest tag, as will soon become apparent. As an option, all the writes belonging to a unique vertex may share the same tag. Such tags may then be walked down the pipelines along with the vertex data.

In addition, for vertex data, a count of the number of parameters for each vertex may be calculated for use by the third multiplexer 322. This count may be used to insure that a previous vertex has been completely flushed before the next one is permitted to be sent to the setup module 202.

Thus, at the third multiplexer 322, priority may be given first to vertex data with an output count not equal to an input count, which indicates that the vertex data is not finished being processed. Once the output count equals the input count for a vertex then it has been completed and is no longer the current vertex and another vertex or register write can be sent to the setup module 202. Thereafter, priority may be given to whichever pipeline has the lowest tag, and then the pipeline including the first FIFO buffer 306. Still thereafter, priority may be given to the pipeline with valid data, as opposed to non-viewport data.

It should be noted that the foregoing tag may also be used in the control flow of the floating point multiplier—which is shared between the l/w multiplication and x, y, and z-value scaling. The issue here is that there could be multiple vertices in the pipeline so the tag is necessary to handle the multiplication correctly.

Figure 10:
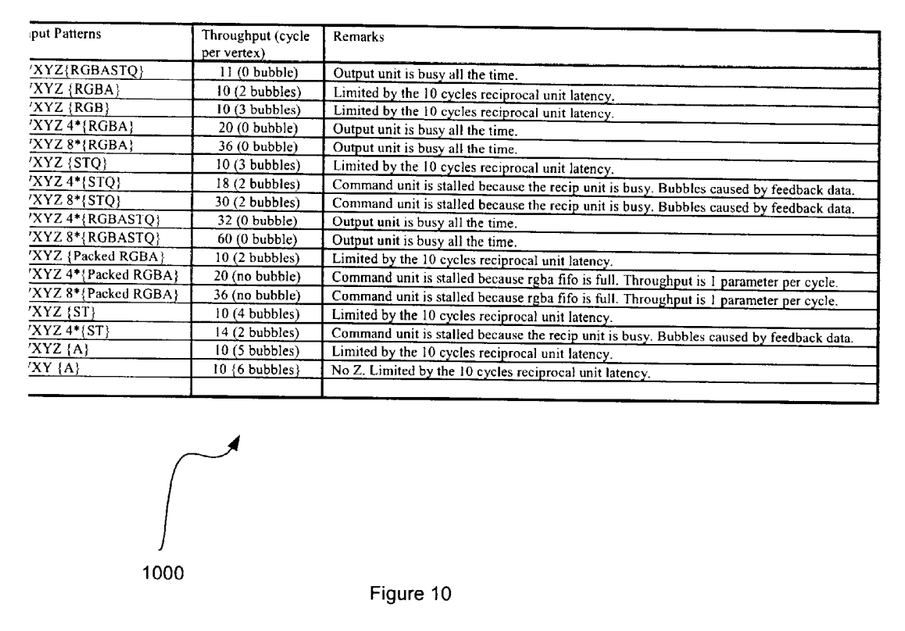
FIG. 10 illustrates the performance difference achieved by the present design of FIG. 3.

Viewport involves the following floating point operations: the perspective divide by the w-value of the x, y, z, s, t, and q-values, transformation of the x, y, and z-values and various scaling functions on the vertex parameters prior to the setup calculations. FIG. 10 illustrates the performance difference 1000 achieved by the present design 300 of FIG. 3.

In order to make the hardware solution more cost effective, special care may be taken in the scheduling of operations such that expensive floating point units are shared to reduce gate count, with little or no performance compromise.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A system for a dedicated hardware-implemented viewport operation in a graphics pipeline, comprising:
   (a) a transform/lighting module for transforming and lighting vertex data;
   (b) viewport hardware coupled to the transform/lighting module for performing a viewport operation on the vertex data; and
   (c) a rasterizer coupled to the viewport hardware for rendering the vertex data;
      wherein the viewport hardware includes an input module coupled to the transform/lighting module for receiving vertex data therefrom;
      wherein the viewport hardware further includes an inverse operation module including an input coupled to an output of the input module for receiving the vertex data therefrom.

2. The system as recited in claim 1, wherein the viewport hardware further includes a first first-in-first-out (FIFO) buffer including an input coupled to the output of tie input module for receiving a first set of vertex data therefrom for temporary storage therein.

3. The system as recited in claim 2, wherein the vies port hardware further includes a second FIFO buffer including an input coupled to the output of the input module for receiving a second set of vertex data therefrom for temporary storage therein.

4. The system as recited in claim 3, wherein the viewport hardware further includes a first multiplexer including a first input coupled to an output of the inverse operation module and a second input for receiving a scaling value.

5. The system as recited in claim 4, wherein the viewport hardware further includes a second multiplexer including a first input coupled to an output of the first FIFO and a second input.

6. The system as recited in claim 5, wherein the viewport hardware further includes a multiplier module including a first input coupled to the output of the first multiplexer, a second input coupled to the output of the second multiplexer, and an output coupled to the second input of the second multiplexer.

7. The system as recited in claim 6, wherein the viewport hardware further includes an adder module including a first input coupled to the output of the multiplier module, and a second input adapted for receiving an offset value.

8. The system as recited in claim 7, wherein the viewport hardware further includes a first scaler module including an input coupled to an output of the adder module for scaling the vertex data.

9. The system as recited in claim 8, wherein the viewport hardware further includes a second scaler module including an input coupled to an output of the second FIFO for scaling the vertex data.

10. The system as recited in claim 9, wherein the viewport hardware further includes a third multiplexer including a first input coupled to the output of the inverse operation module, a second input coupled to an output of the first scaler module, and a third input coupled to an output of the second scaler module.

11. A system for a dedicated hardware-implemented viewport operation in a graphics pipeline, comprising:
(a) a transform/lighting module for transforming and lighting vertex data;
(b) viewport hardware coupled to the transform/lighting module for performing, a viewport operation on the vertex data; and
(c) a rasterizer coupled to the viewport hardware for rendering the vertex data;
wherein the viewport hardware includes a multiplier, an adder, a scaler, a first-in-first-out (FIFO) buffer, and an inverse operation module.

12. A system for a dedicated hardware-implemented viewport operation in a graphics pipeline, comprising:
(a) a transform/lighting module for transforming and lighting vertex data;
(b) viewport hardware coupled to the transform/lighting module for performing a viewport operation on the vertex data; and
(c) a rasterizer coupled to the viewport hardware for rendering the vertex data;
wherein the viewport hardware includes an inverse operation module.

13. A system for a dedicated hardware-implemented viewport operation in a graphics pipeline, comprising:
(a) a transform/lighting module for transforming and lighting vertex data;
(b) viewport hardware coupled to the transform/lighting module for performing a viewport operation on the vertex data; and
(c) a rasterizer coupled to the viewport hardware for rendering the vertex data;
wherein the viewport hardware includes a multiplier, an adder, and a first-in-first-out (FIFO) buffer.

14. A method for performing a viewport operation in dedicated hardware in a graphics pipeline, comprising:
(a) transforming and lighting vertex data utilizing a transform/lighting module;
(b) performing a viewport operation on the vertex data utilizing viewport hardware coupled to the transform/lighting module; and
(c) rendering the vertex data utilizing a rasterizer coupled to the viewport hardware;
wherein the vertex data is processed in the viewport hardware out of order with respect to an order in which the vertex data is received.

15. A method for performing a viewport operation in dedicated hardware in a graphics pipeline, comprising:
(a) transforming and lighting vertex data utilizing a transform/lighting module;
(b) performing a viewport operation on the vertex data utilizing viewport hardware coupled to the transform/lighting module; and
(c) rendering the vertex data utilizing a rasterizer coupled to the viewport hardware;
wherein an inverse operation associated with the viewport operation is performed utilizing a dedicated inverse operation module in the viewport hardware.

16. A method for performing a viewport operation in dedicated hardware in a graphics pipeline, comprising:
(a) transforming and lighting vertex data utilizing a transform/lighting module;
(b) performing a viewport operation on the vertex data utilizing viewport hardware coupled to the transform/lighting module; and
(c) rendering the vertex data utilizing a rasterizer coupled to the viewport hardware;
wherein the viewport operation is carried out utilizing a plurality of parallel pipelines in the viewport hardware.

17. The method as recited in claim 16, wherein the parallel pipelines include a first pipeline for processing a first set of vertex data including x-values, y-values, z-values, s-values, t-values, and q-values.

18. The method as recited in claim 17, and further comprising buffering the first set of vertex data utilizing the first pipeline in the viewport hardware.

19. The method as recited in claim 17, and further comprising transforming the first set of vertex data utilizing the first pipeline in the viewport hardware.

20. The method as recited in claim 17, and further comprising scaling the first set of vertex data utilizing the first pipeline in the viewport hardware.

21. The method as recited in claim 16, wherein the parallel pipelines include a second pipeline for processing a second set of vertex data including a-values, r-values, g-values, and b-values.

22. The method as recited in claim 21, and further comprising buffering the second set of vertex data utilizing the second pipeline in the viewport hardware.

23. The method as recited in claim 21, and further comprising unpacking the second set of vertex data utilizing the second pipeline in the viewport hardware.

24. The method as recited in claim 21, and further comprising scaling the first set of vertex data utilizing the second pipeline in the viewport hardware.

25. A method for performing a viewport operation in dedicated hardware in a graphics pipeline, comprising:

(a) transforming and lighting vertex data utilizing a transform/lighting module;

(b) performing a viewport operation on the vertex data utilizing viewport hardware coupled to the transform/lighting module; and (c) rendering the vertex data utilizing a rasterizer coupled to the viewport hardware;

wherein the vertex data is tagged in the viewport hardware.

26. The method as recited in claim 25, wherein the vertex data is tagged in the viewport hardware in order to maintain an order in which the vertex data is outputted form the viewport hardware.

27. The method as recited in claim 25, wherein the vertex data is tagged in the viewport hardware in order to process the vertex data out of order.

28. A system for a dedicated hardware-implemented viewport operation in a graphics pipeline, comprising:

(a) an input module coupled to a transform/lighting module for receiving vertex data therefrom;

(b) an inverse operation module including an input coupled to an output of the input module for receiving the vertex data therefrom, the inverse operation adapted for performing an inverse operation on the vertex data;

(c) a first first-in-first-out (FIFO) buffer including an input coupled to the output of the input module for receiving a first set of vertex data therefrom for temporary storage therein, the first set of vertex data including x-values, y-values, z-values, s-values, t-values, and q-values;

(d) a second FIFO buffer including an input coupled to the output of the input module for receiving a second set of vertex data therefrom for temporary storage therein, the second set of vertex data including a-values, r-values, g-values, and b-values;

(e) a first multiplexer including a first input coupled to an output of the inverse operation module and a second input for receiving scaling values, the first multiplexer adapted for selectively outputting the vertex data from the first and second inputs to an output thereof;

(f) a second multiplexer including a first input coupled to an output of the first FIFO and a second input, the second multiplexer adapted for selectively outputting the vertex data frown the first and second inputs to an output thereof;

(g) a multiplier module including a first input coupled to the output of the first multiplexer, a second input coupled to the output of the second multiplexer, and an output coupled to the second input of the second multiplexer, the multiplier module adapted for multiplying the vertex data at the first and second inputs thereof;

(h) an adder module including a first input coupled to the output of the multiplier module, and a second input adapted for receiving an offset value, the adder module adapted for adding the vertex data at the first and second inputs thereof;

(i) a first scaler module including an input coupled to an output of the adder module for scaling the vertex data;

(j) a second scaler module including an input coupled to an output of the second FIFO for scaling the vertex data; and (k) a third multiplexer including a first input coupled to the output of the inverse operation module, a second input coupled to an output of the first scaler module, and a third input coupled to an output of the second scaler module, the third multiplexer adapted for selectively outputting the vertex data from the first, second, and third inputs to an output thereof;

(l) wherein a viewport operation is performed on the vertex data.

* * * * *